Nov. 11, 1924.  1,514,913
A. KORONSKI
FASTENER SETTING DEVICE
Filed April 14, 1921    6 Sheets-Sheet 1
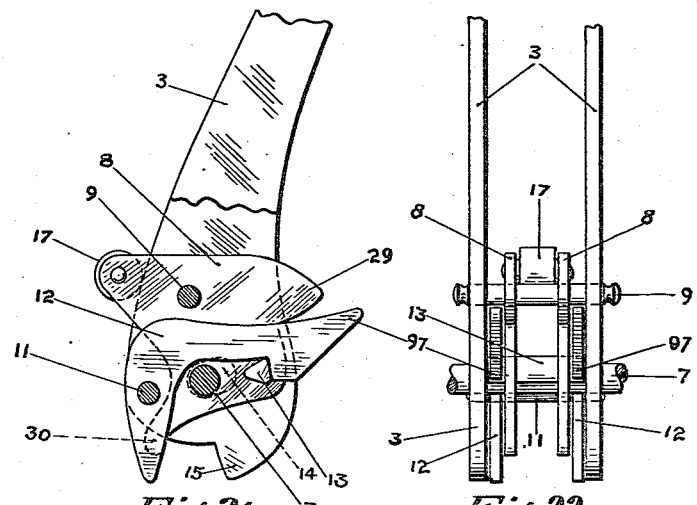
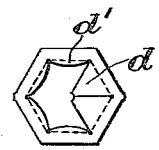
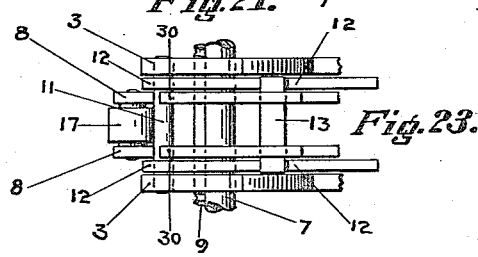
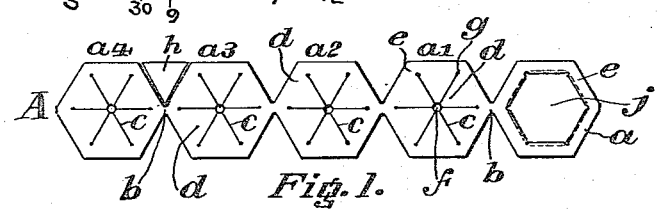
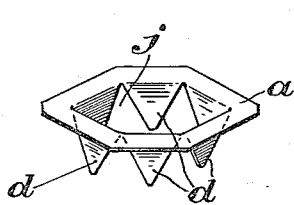
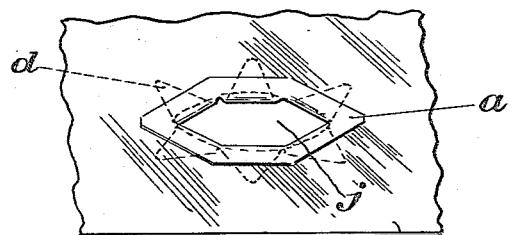
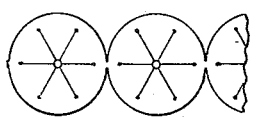
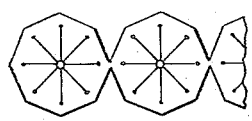
INVENTOR
André Koronski
BY Cornelius D. Ehret
his ATTORNEY

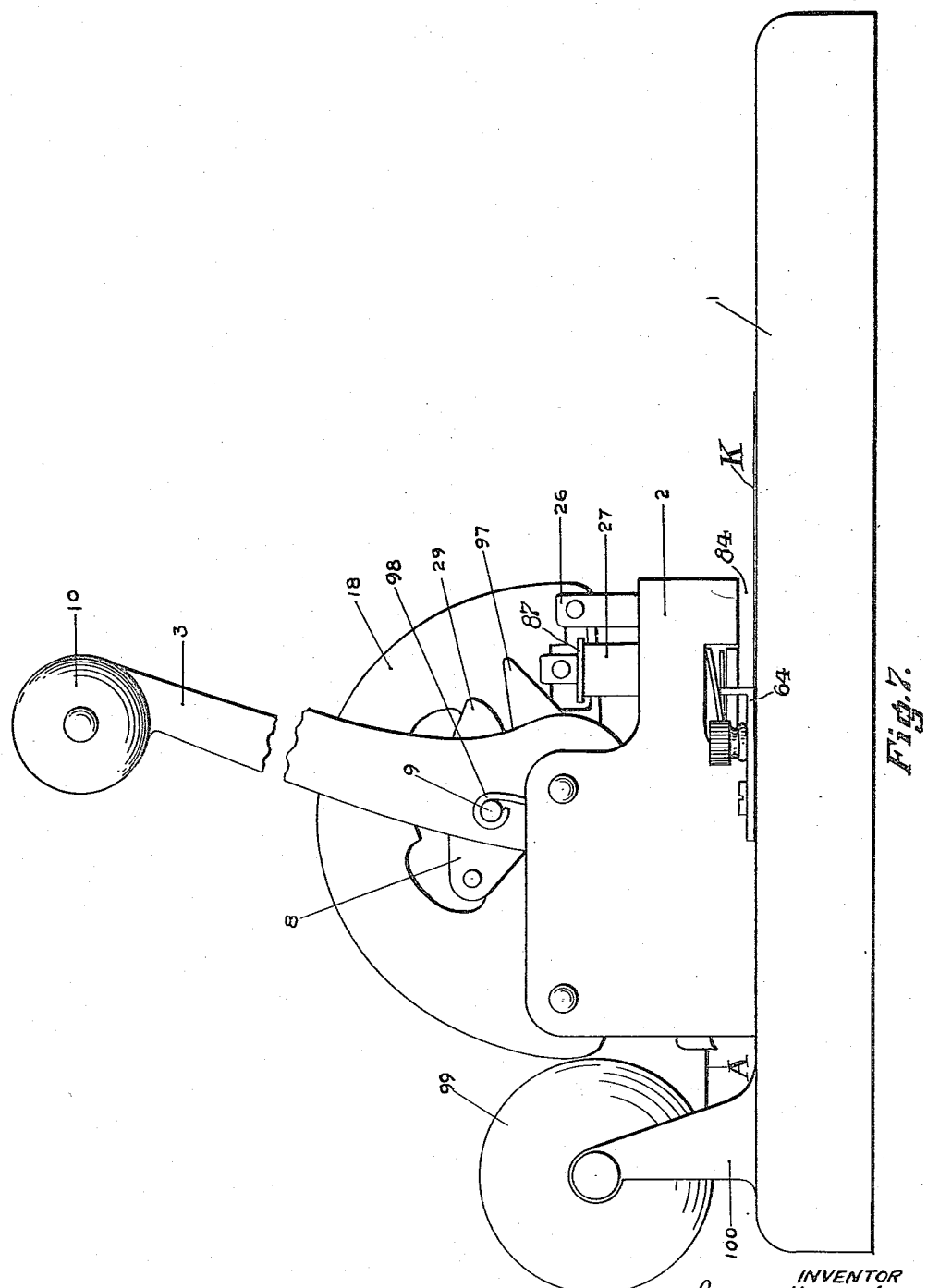

Nov. 11, 1924.  
A. KORONSKI  
1,514,913  
FASTENER SETTING DEVICE  
Filed April 14, 1921  6 Sheets-Sheet 3
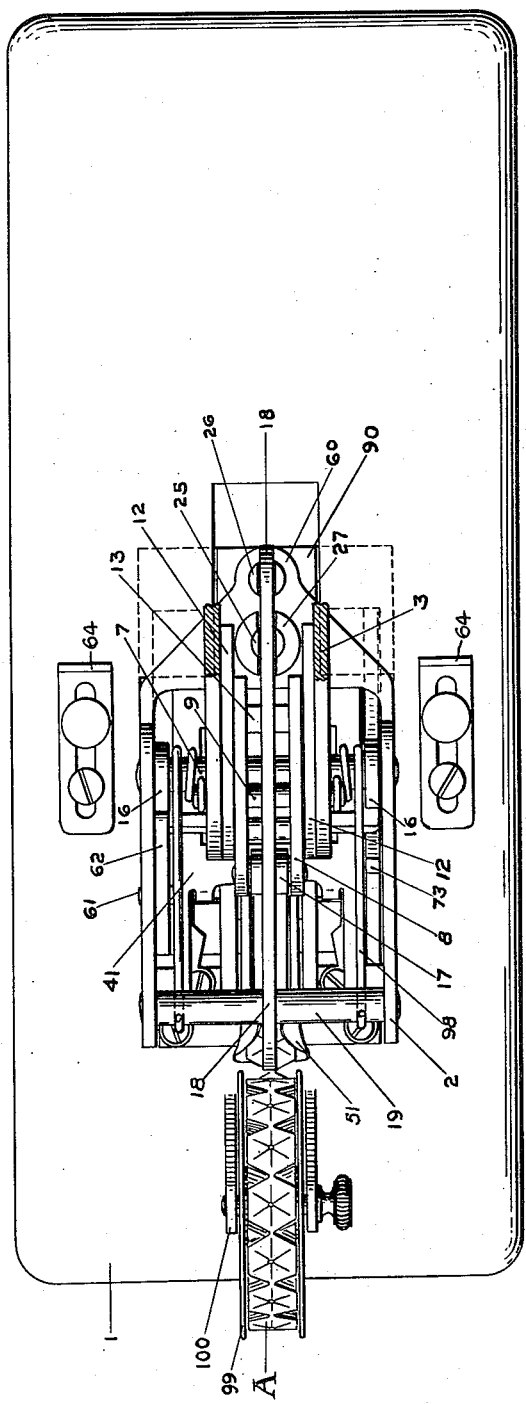
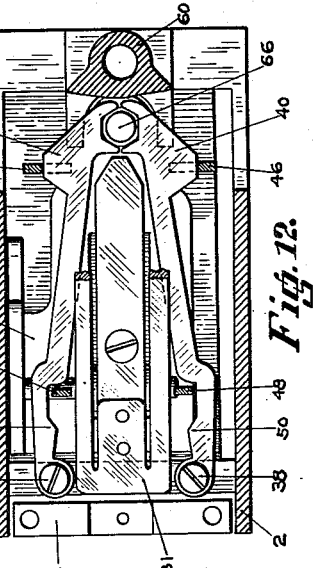
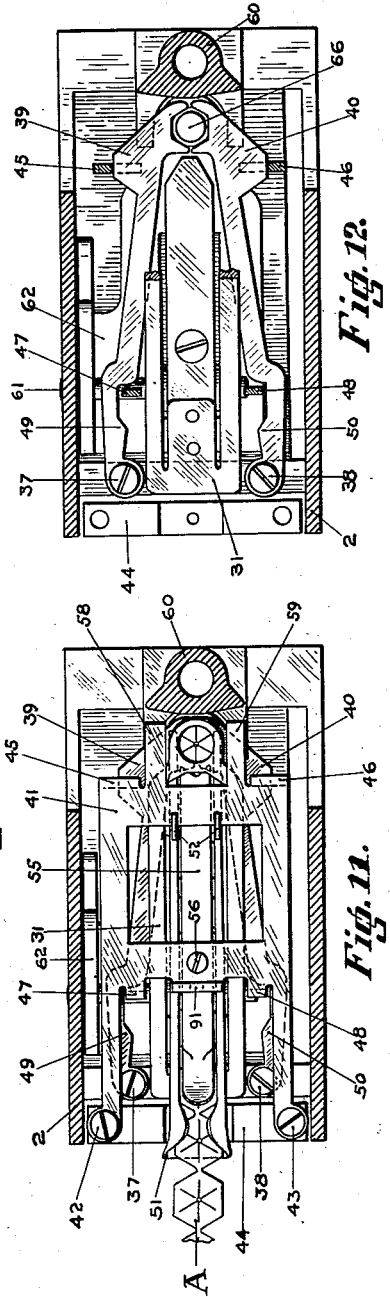
INVENTOR  
André Koronski  
BY Cornelius D. Ehret  
his ATTORNEY

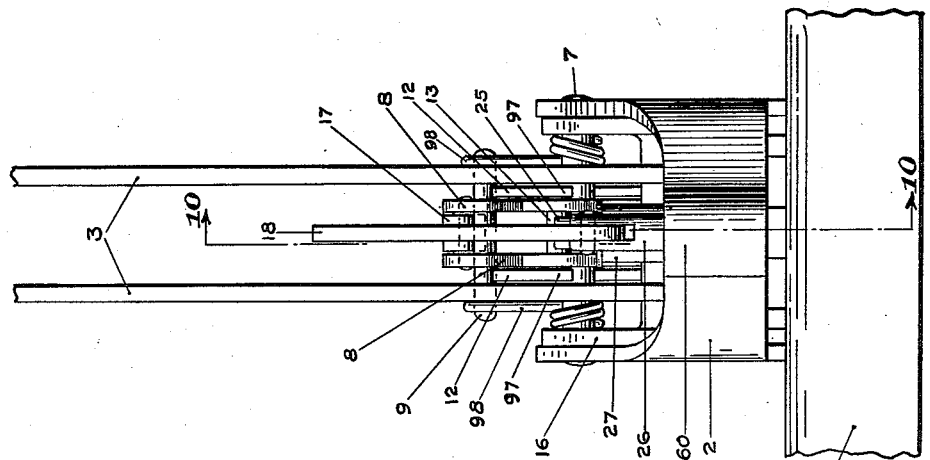
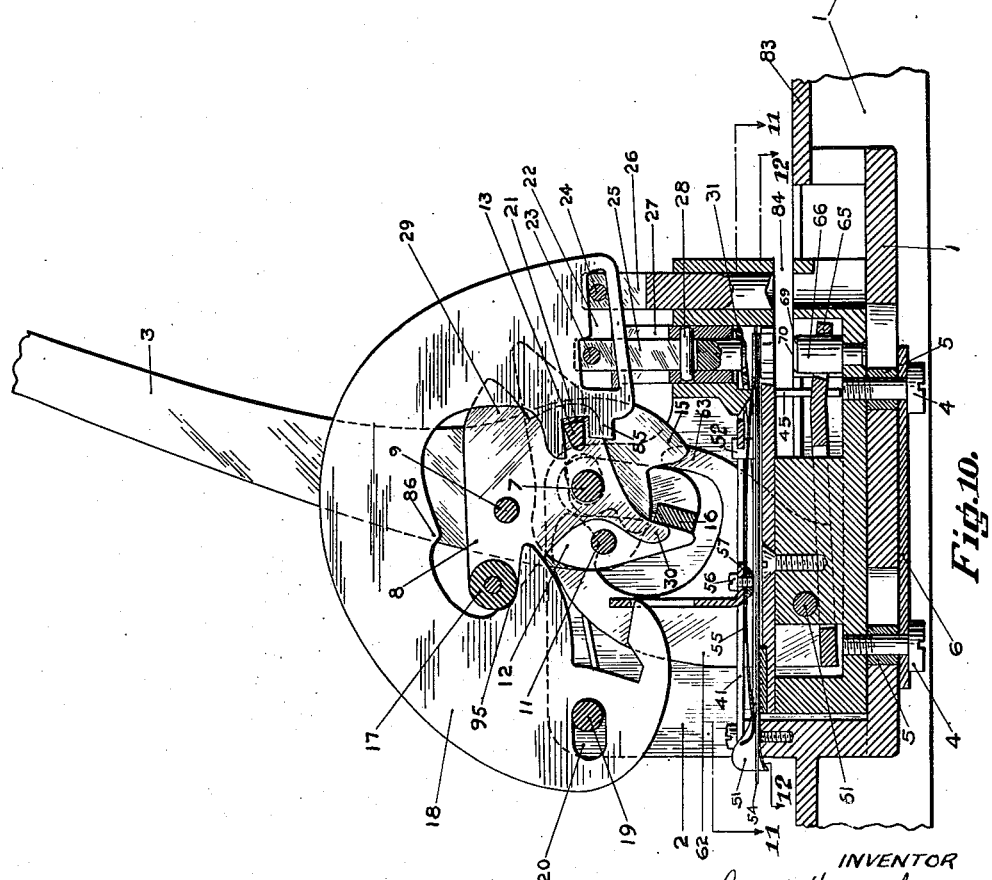

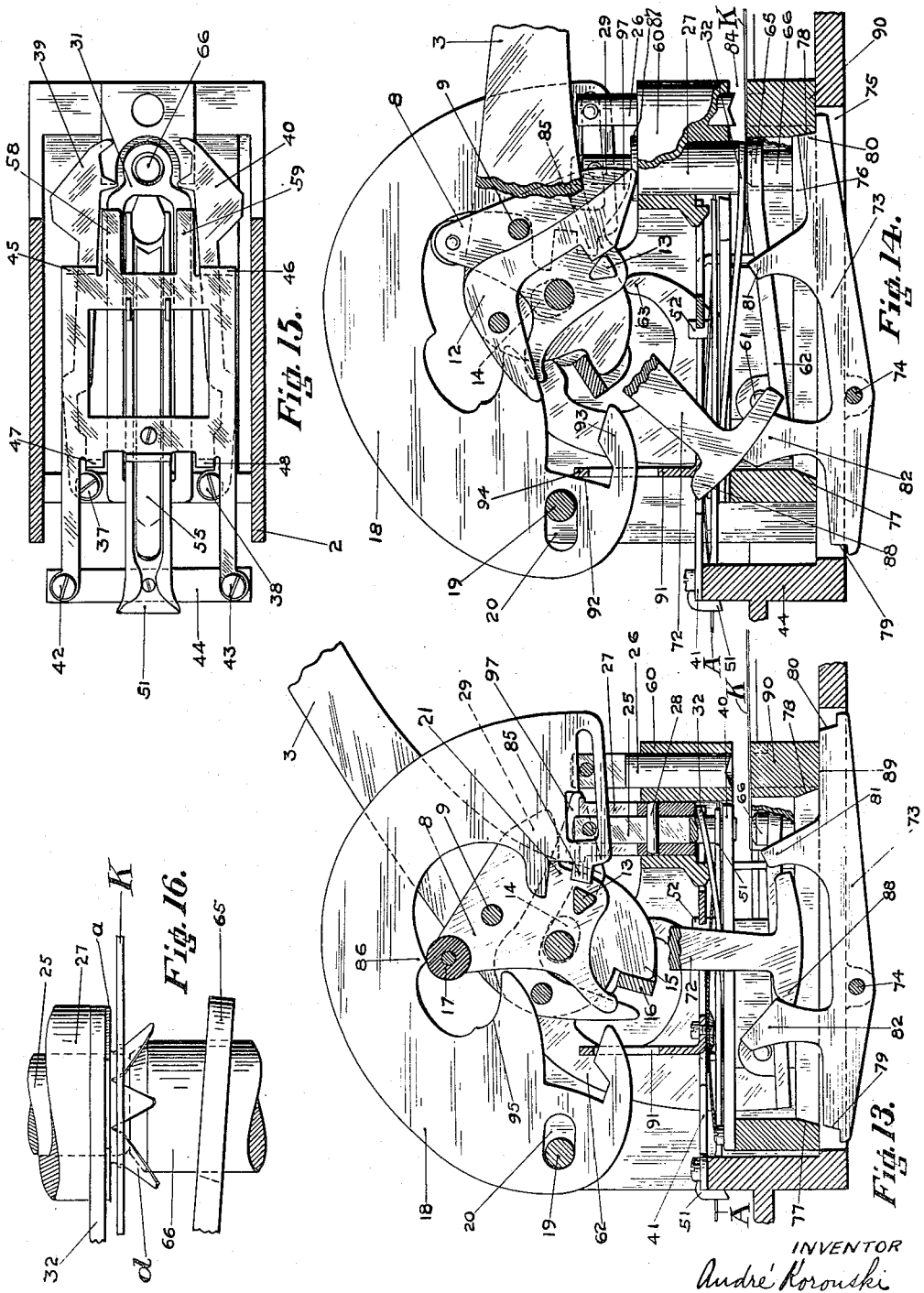

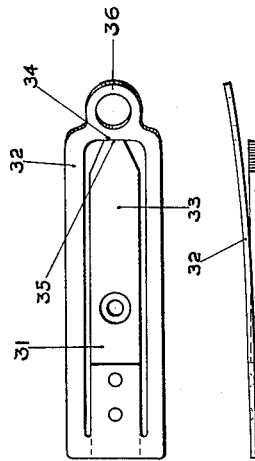
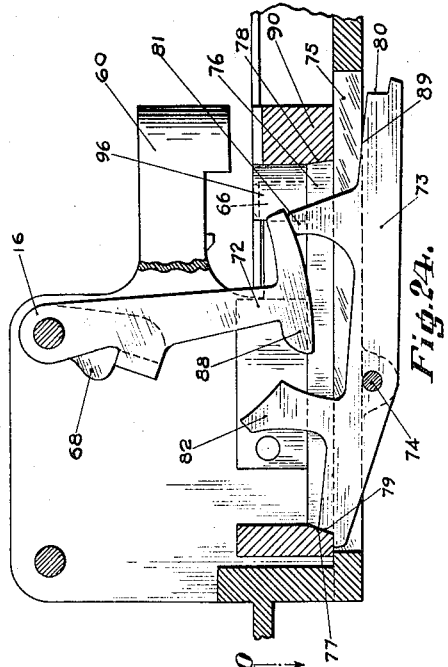
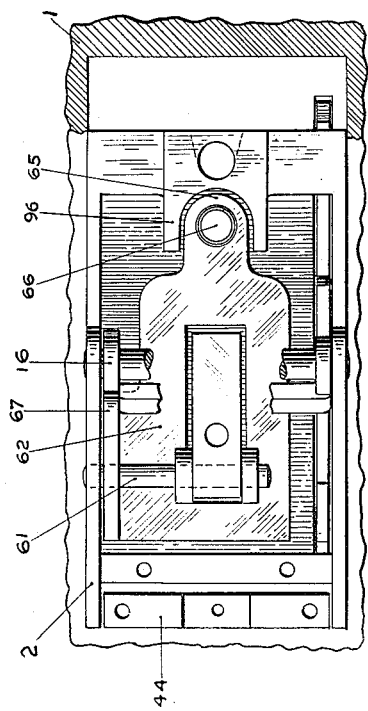
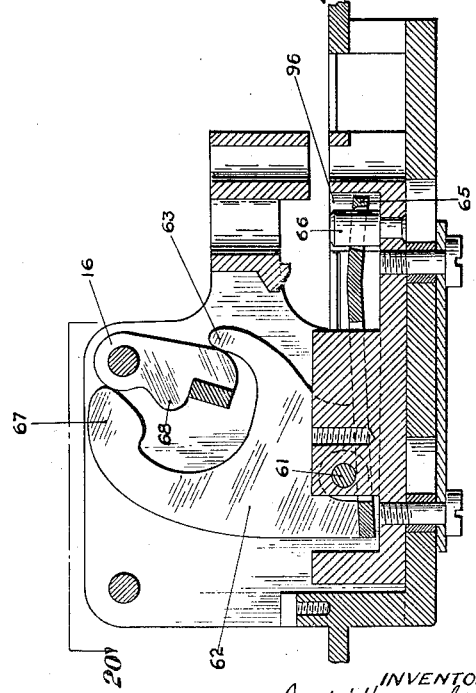

Patented Nov. 11, 1924.

1,514,913

UNITED STATES PATENT OFFICE.

ANDRÉ KORONSKI, OF NARBERTH, PENNSYLVANIA, ASSIGNOR OF ONE-HALF TO HORACE C. KNERR, OF PHILADELPHIA, PENNSYLVANIA.

FASTENER-SETTING DEVICE.

Application filed April 14, 1921. Serial No. 461,263.

*To all whom it may concern:*

Be it known that I, ANDRÉ KORONSKI, a citizen of the United States, residing in Narberth, county of Montgomery and State of Pennsylvania, have invented new and useful Improvements in Fastener-Setting Devices, of which the following is a specification.

My invention relates to fastener setting devices and has for its object to provide a device for forming an eyelet from a strip of material and for setting the same in one or more pieces of material.

Another object of my invention is to provide a device in which the strip of material from which the eyelets are formed consists of a plurality of flat discs connected together so as to form a continuous tape which may be wound on a spool.

A further object of my invention is to provide a device for forming and setting an eyelet so thin and flat that it does not appreciably add to the thickness of the material in which the eyelet is set and which when secured in the material is rendered secure against turning in the material thereby preventing the pieces of the material secured together from swinging around edgewise of each other.

With the above mentioned objects in view and others which will become apparent as the description proceeds my invention consists in the combinations, constructions and arrangements of parts hereinafter described and claimed, the advantages of which will be obvious to those skilled in the art from which the following description is taken in connection with the accompanying drawings illustrating the several features of the present invention in their preferred form.

In the drawings, Fig. 1 is a plan of a length of tape such as contemplated by my invention and comprising a series of discs integrally connected together and the end disc shown with the prongs forced out.

Fig. 2 is a perspective view of an eyelet which is formed from the tape.

Fig. 3 is a perspective view of a completed eyelet after insertion in a hole to be reinforced.

Fig. 4 is a plan view of a special form of disc before the prongs are completely forced out.

Figs. 5 and 6 are plan views of short lengths of tape comprising slightly modified types of discs.

Figs. 7 and 8 are side elevational and plan views, respectively, of an eyeleting machine constructed in accordance with my invention, part of the operating handle being broken and removed from Fig. 8.

Fig. 9 is a front end elevation of the machine, from the right of Figs. 7 and 8.

Fig. 10 shows a vertical longitudinal section through the machine proper, taken about as indicated by the line 10—10 in Fig. 9, with the operating parts in the positions shown in Figs. 7 and 8.

Fig. 11 shows a horizontal section through the machine proper (with certain parts omitted for the sake of clearness) taken as indicated by the line 11—11 of Fig. 10.

Fig. 12 is a view similar to Fig. 11, taken on the line 12—12 of Fig. 10, with certain parts shown in Fig. 1 removed or partly broken away.

Fig. 13 is a view similar to Fig. 10, with some of the parts there appearing in section shown in full; it also shows certain parts in front of the planes 10—10. Moreover, while the movable carriage is in the same position in Fig. 13 as in Fig. 10, some of the operating parts are displaced somewhat from their positions in Fig. 10.

Fig. 14 is a view similar to Fig. 13 with additional parts in full, and with the carriage at the other extreme of its movement and other operating parts further displaced from their positions in Fig. 10.

Fig. 15 is a view similar to Fig. 11, but shows the carriage in the same position as in Fig. 14, and certain operating parts in correspondingly different positions. Moreover, the eyelet tape is omitted.

Fig. 16 is a fragmentary detail view, on an enlarged scale, illustrating the operation of the eyeleting mechanism.

Fig. 17 is a detached plan view of an eyelet-severing device forming part of the machine; and Fig. 18 is a corresponding side elevation.

Fig. 19 shows the carriage and the eyelet-clincher in longitudinal vertical mid-section, together with certain associated parts.

Fig. 20 is a corresponding plan view with certain parts broken away and removed, as indicated by the line 20—20 in Fig. 19.

Fig. 21 is a fragmentary side elevation showing the main operating lever of the machine with certain associated parts, one side member of the lever being partly broken away.

Fig. 22 is a corresponding front elevation, from the right of Fig. 21.

Fig. 23 is a view of the same parts from beneath.

Fig. 24 shows a longitudinal vertical section through the movable carriage of the machine, and also shows certain parts and device for shifting and locking the carriage.

The tape A shown in Fig. 1 comprises a series of sheet metal discs $a$, $a^1$, $a^2$, etc., integrally united at their opposite sides by sheet metal webs $b$ so narrow as to be readily severed to detach the discs. The discs $a^1$, $a^2$, etc., are perfectly flat and obviously just alike, so that the disc $a^1$ may be described as an example.

In the disc $a^1$ are a number of slits $c$ (here six) radiating from a common center at the center of the disc, and thus forming a corresponding number of triangular tangs $d$ united by the integral rim or periphery $e$ of the disc. The center of the disc is pierced with a hole $f$ which facilitates the shearing apart of the tangs $d$, reduces their length slightly, and obviates their being so sharply pointed as to catch readily on the edges of papers, etc. when the eyelet is in use. The shearing apart of the tangs $d$ is facilitated and the outer ends of the slots are defined by slight indentations or holes $g$ formed or pieced in the disc as at the vertices of a regular polygon centered about the central hole $f$. The holes $f$ and $g$ and the slits $c$ may be formed successively in a single die-punching and shearing operation—the operation being repeated at suitable intervals in the length of a narrow, uniform metal ribbon as many times as there are eyelets to be formed. At each repetition of the aforesaid operation, suitable pieces $h$ may be sheared out of the opposite edges of the ribbon to define the individual eyelet portions or discs and leave them united by the narrow central webs $b$.

Referring to the piece $a$ and to Fig. 2, it will be seen how readily the slitted disc can be converted into the completed blank $a$ by simply bending the tangs $d$ apart out of the plane of the disc from and along the sides of a polygonal (hexagonal) hole $j$ which is thus opened up in the piece. As shown, the tangs $d$ thus opened in the disc extend at right angles to the plane of the disc. And from Fig. 3 it will be seen how readily the blank $a$ may be inserted in the hole to be reinforced and its tangs $d$ expanded or bent outward and flattened down on the other side of the material $k$. If the hole be a fairly snug fit thereon, as shown, the edges of the tangs $d$ at the corners of the polygonal eyelet will engage or catch in the edges of the material $k$, and help the friction of the rim $l$ and tangs $d$ on the material to secure the eyelet non-rotatably in place, the natural sharp edges of the tangs $d$ also biting into the material $k$ if said tangs have been flattened down well.

Fig. 4 shows a modified form of disc with some of its tangs $d'$ greatly abbreviated in length. In use, the abbreviated tangs $d'$ will merely be bent apart at right angles to the plane of the disc and allowed to extend through the hole in the sheets to be secured in that position, while the ordinary tangs $d$ will be bent on over and flattened down on the sheets. This modified form of eyelet can be readily released from the sheets to allow them to be separated when desired.

The opening $j$ shown in Figs. 1 to 4 are of regular hexagonal form, and the discs there shown are likewise regular hexagons in outline. In order that the homologous sides of the disc and of the opening $j$ may be parallel, as shown, the six slits $c$ in the disc $a^1$, etc., are shown as radiating 60 degrees apart from the central hole $f$ directly toward the angles of the disc. In Fig. 5, the discs are circular (i. e., in effect regular polygons of a great many sides), while the slits $c^1$ are still 60 degrees apart as before. In Fig. 6, the discs are regular octagons, and the slits $c^2$ radiate directly toward their angles 45 degrees apart, so as to give, as in Figs. 1 to 4, a polygonal eyelet opening similar to and concentric with the disc outline. It will be seen that the hexagonal form is the simplest and most economical to make out of uniform ribbon.

The material used for the eyelets may advantageously be brass or other metal suitably workable, and sufficiently stiff when very thin.

Referring now to Figs. 7, 8, 9, 10 and 11, it will be seen that the device shown for setting the eyelets comprises a frame 2 mounted on a base 1, and that it receives the tape A from a feed spool 99 rotatably mounted at the rear of the frame 2, between bracket lugs 100 upstanding from said base. The mechanism for operating on the paper or other sheet material K to be reinforced or secured together includes a punch 26 for making a hole in the material and setting means for an eyelet which comprises inner and outer telescoping plunger members 25 and 27. The paper punch 26 and the eyeleting members 25, 27 are mounted in vertical slideways in a part 60 at the front of the frame 2. The tape A passes forward through the machine to the setting members 25, 27 in a flat feedway 51 (with inturned upper edges) which is screwed fast to an upstanding lug 44 on a bed-piece 75 forming part of the base 1. Just above the base 1, the part 60 has an opening 84 for admitting the material K beneath the members 26 and 25, 27.

I prefer to provide for successive operation of the members 26 and 27 on the same portion of the material K by shifting the members rather than by shifting the material K; accordingly, adjustable stationary stops 64 are provided for engaging the edge of the material K when it is in a definite position on the base 1 corresponding to the desired location of the eyeleted hole, and the whole frame 2 is made a carriage shiftable to and fro on the base 1 in the direction of the feedway 51 over a range corresponding to the distance apart of the paper punching and eyelet setting means in the part 60. The carriage 2 is held to the bed-piece 75 by a plate 6 beneath the latter secured to the lower side of the carriage by screws which extend through slots in the bed-plate, and bushings 5 on the screws 4 engaged in the slots guide and limit the motion of the carriage. The plate 6 may be made springy and initially bent upward in its center, so as to prevent rattling of the carriage without causing excessive friction. Provision is made for locking the carriage 2 fast at either extreme of its movement by means of a locking member 73 mounted in a slot in the bed-piece 75 and pivoted thereto at 74, and having at its ends inclined surfaces 79 and 80 for engaging corresponding surfaces 77 and 78 on the carriage; see Figs. 13, 14 and 24. A double-mounted operating lever member 3 with a handle 10 is mounted on the carriage 2, and is movable with reference thereto to shift the carriage and to actuate the various operating parts and mechanisms of the machine, including the members 26 and 25, 27. Each stroke of the operating member 3 punches a hole, forms the prongs on a disc and sets an eyelet.

In Figs. 7, 8, 9, 10 and 11, the machine is shown with the lever 10 in the uppermost position of its range of swinging movement and with all its other parts and mechanisms in their corresponding positions, ready to begin a cycle of operations when the lever 3 is manually depressed. Referring also to Figs. 12, 13, 14, 15 and 16, it is to be understood that the sheet material K to be eyeleted is pierced by the "paper" punch 26 with the carriage 2 in its rearmost position shown in Figs. 7 to 11, and that with the carriage 2 in this same position, the prongs are formed in the disc at the forward end of the tape A (see Figs. 1 and 2) by the inner plunger 25. After its descent from the position shown in Fig. 10 through the sheet material K at 84, the paper punch 26 is raised again to its initial position before the carriage 2 is shifted at all; see Fig. 13. The inner plunger 25, however, is not retracted fully after its descent from the position shown in Fig. 10 to form the prongs on the disc, but remains about in the position shown in Fig. 13, with its lower end engaged in the end disc. As a result of the plunger 25 remaining in the end disc the same is carried forward, and the tape A is drawn forward in the feedway 51, with the advance of the carriage 2 to its forward position shown in Figs. 14 and 15; and the next disc thereof is thus brought into position to have its prongs formed by the plunger 25 at the beginning of the next succeeding cycle of operation of the machine. The forward movement of the carriage having brought the disc with its prongs formed thereon over the hole already punched in the material to be eyeleted, this disc is cut off, and the hole is eyeleted therewith, by the combined action of the plungers 25 and 27 in co-operation with certain parts associated with them; see Fig. 14.

This last operation is completed as the lever 3 reaches the lowermost position of its range of swinging movement, as shown in Fig. 14. The upward return movement of the lever 3 (which may be produced automatically by the spring 98, 98, shown in Figs. 7, 8 and 9) causes the plungers to be released from the completely set eyelet, returns the carriage 2 to its initial rearmost position, and restores the various other operating parts to their initial positions, ready for a new cycle of operation, on another sheet of material to be eyeleted. During the return movement of the carriage 2, retrograde movement of the tape A is prevented by a bowed leaf spring 55 whose middle is secured at 56 to a frame 41 (Figs. 10, 11, 13 and 15) fixed to the bed-plate lug 44 by screws 42 and 43. The ends of this spring 55 frictionally engage and press on the upper side of the tape A, between the inturned edges of the feedway 51. The frame 41 overlies the guideway 51, and the forward end of the latter has upstanding lugs 52 which engage in notches in the frame and so help to hold the guideway in position. The construction and operation of the various parts and devices which co-operate with the members 26 and 25, 27 can now be intelligibly explained.

During the formation of the prongs on the disc by the inner member 25, the disc is supported by means of two members 39 and 40, which are secured to the carriage 2 by means of screws 37 and 38. (See Figs. 11, 12 and 13.) The forward jaw-like ends of these supporting members 39 and 40 together afford a hexagonal opening just beyond and beneath the forward end of the feedway 51, co-axial with the punch member 25; and the straight edges of this opening extend across the roots of the tangs $d$ and insure that the opening $i$ in the completed disc shall be a regular hexagon in proper relation to the sides of the hexagonal disc itself (Figs. 1 and 2). So long as the carriage 2 remains in its rearmost position, the forward jaw ends of the members 39 and 40 are held together (as shown in Figs. 11 and 12) by lugs 45 and 46 projecting downward from the frame 41; but as the carriage moves forward and carries the jaws with it, the jaw ends are released from these lugs and are swung and held apart (as shown in Fig. 15) by other lugs 47 and 48, which project downward from the frame 41 and engage cam portions 49 and 50 near the rear ends of the members 39 and 40. This movement carries the supporting members 39 and 40 out of the way and permits the disc to be pressed downward and further operated upon by the eyelet setting members 25, 27.

Referring now to Figs. 10 to 15, 17 and 18, it will be seen that on the carriage 2 is mounted and screwed fast a tape-severing device comprising a stout, rigid central knife member 33, with a bevelled transverse cutting edge 35 at its forward end, and a much thinner springy, flexible, yoke-like knife member 32 whose rear end has an inwardly-projecting tongue which is riveted to the rear end of the central member 33. The yoke 32 is flexible up and down the top plane of the member 33, but resiliently biased toward a normal position above said plane, as shown in Figs. 10, 11 and 18. The inner side of the yoke 32 has a transverse cutting edge 34 adapted to co-operate with the edge 35 on the member 33 as a shearing cutter. The forward end 36 of the yoke 32 is rounded to the diameter of the outer member 27, and is in vertical alignment with said member, and it has a hole so large as to permit perfectly free up and down movement of the inner plunger 25 therethrough at all times. The guideway 51 overlies the member 33, and its forward end directs the tape A directly across the edge 35, through the yoke 32 and beneath its cutting edge 34. The edges 35 and 34 are so located with reference to the members 25, 27 that when the descending member 27 engages the actuating portion 36 of the knife-yoke 32 which lies directly in its path, it forces the edge 34 down across the edge 35 and severs the web $c$ connecting the disc then "impaled" on the member 25 from the rest of the tape A.

Referring now to Figs. 10, 12 to 14, 16, 19 and 20, it will be seen that on the carriage frame 2 there is a cylindrical anvil 66 with a conically bevelled upper end in alignment with the eyelet setting members 25, 27. The plunger 25 is slotted longitudinally, and a transverse pin 28 fixed in the plunger 27 extends across its bore through the slot. The pin 28 is provided to connect the plunger 25 and the outer plunger 27 so that said plunger 27 may be raised to its original position on the return stroke of the lever 3. After the yoke 32 has been forced down by the descending plunger 27 and has detached the disc $a$ with its tangs $d$ (Fig. 2) from the tape A, the plunger 27 pushes the detached eyelet on down ahead of the yoke part 36, as shown in Fig. 16. As a result, the eyelet is first inserted through the hole in the material K under guidance of the plunger 25, and is then clinched.

Referring to Figs. 7, 9, 10 and 11, the part 96 which is integral with the carriage 2 and which partly surrounds the anvil 66 prevents the material which is being eyeleted from being pushed down by the prong of the eyelet, thus ensuring the passage of said prongs through the hole in said material. The first step in the clinching operation consists in bending outward the tangs $d$ of the eyelet as it is forced against (and supported on) the conical anvil 66 by the parts 36 and 27. Thereupon or thereafter, the expanded eyelet is flattened upon the material K (and the clinching thus completed) by means of a rocking lever member 62, whose flat-faced acting end 65 is apertured to allow it to move up and down around the anvil 66. The part 65 moves upward in opposition to the plunger 27 and bends the tangs $d$ flat against the material K in the manner indicated in Figs. 16 and 14, pressing and flattening the sides of the eyelet upon the material K with considerable force. Thus, the eyelet is set and the eyeleting operation is concluded.

I will now explain the actuation of the various parts and mechanisms of the machine from the lever 3 to produce the various operations described above.

In a general way, it may be said that the lever 3 swings up and down about a transverse pivot rod 7, which extends from side to side of the carriage through slots 14 (Figs. 13, 14 and 21) in the members of the lever. On this same rod 7 (between the side members of the lever 3) is also pivoted a part 8 consisting of a pair of irregular-shaped plates united by a sleeve which surrounds said rod 7, and also by a bar 13 (see also Figs. 22 and 23) whose ends project as lugs to each side of said plates. This part 8 carries a rod or pin 9 which extends to either side of it through the members of the lever 3 and forms a pivot for it movable with said parts. Thus, the lever 3 is capable of a limited swing on the fulcrum 9 independently of the fulcrum 7; while when it does swing on the fulcrum 7, it carries the part 8 with it by virtue of the connection 9.

A pair of angular-shaped flat pawls 12 are pivoted to the lever 3 by a rod or pin 11, one at either side of the part 8, between the sides of the lever 3. The dog-like forward ends 85 of the pawls 12 are adapted to hook or latch over the lugs 13, 13 on the part 8, as shown in Figs. 10, 13 and 21; and while so latched, they prevent relative angular movement of the lever and the part 8 about the pivot 9, thus making them virtually one part pivoted on the rod 7, which is then at the rear end of the slot 14.

Besides the lever 3 and the part 8, there is pivoted on the rod 7 a yoke-shaped device (see Fig. 24) comprising a bridge-piece 16 which unites a cam-piece 68 just within one side of the carriage frame 2 to a lever 72 with a segmental locking member 88 concentric with the pivot 7 at its lower end, just within the other side of the frame 2. When the lever 3 is in its highest position, as shown in Figs. 7, 8 and 9, the device 16 occupies about the position shown in Fig. 24, with its segment 88 overriding an upstanding lug 81 on the forward end of the locking member 73 and thus locking the rear end of the member 73 against the corner 77 on the carriage 2, so as to lock the carriage in its rearmost position.

When the lever 3 is swung downward, the position of the locking parts remains unchanged until the toes 15 at the lower end of the lever 3 strike the bridge-piece 16 and swing the whole part 16 to the rear. The segment 88 first rides off the lug 81 and releases the member 73, then strikes an upstanding lug 82 on the rear end 79 of the member 73 and rocks said end 79 down so as to disengage it from the carriage 2 at 77 and release the carriage, as shown in Fig. 13. The member 73 is speedily arrested by its end 80 striking the bottom of the carriage at 89, so that its lug 82 becomes, in effect, a fixed abutment or fulcrum for the lever 72. Further swinging of this lever 72 with the lever 3 (of which it is now in effect an extension, for the time being) can only occur through yielding of its abutment 7 on the carriage; accordingly, the carriage is now shifted forward to that extreme of its movement. As the carriage 2 reaches the extreme forward position, its corner 78 passes beyond the engagement surface 80 on the forward end of the member 73 and releases the latter, so that the pressure of the lever 72 against the lug 82 rocks the locking member 73 and swings its end 80 up against the corner 78 of the carriage 2, thus locking the carriage in its extreme forward position. During further movement of the levers 3 and 72 in the same direction, the segment member 88 idly overrides the lug 82, thus locking the locking member 73.

During the latter part of the downward swing of the lever 3, after the carriage 2 has been thus locked in forward position, the cam portion 68 of the part 16 engages one arm 67 of an upstanding lug on the clinching lever 62 and swings the acting portion 65 thereof up against the tangs $d$ to flatten or clinch the eyelet, as already described.

When the lever 3 swings upward, the lower ends of the pawls 12 and the lower corners 30 of the part 8 strike the bridge portion of the device 16 and swing the lever 72 forward, unlocking the carriage 2, shifting it rearward, and relocking it in its rearmost position. Also, the cam 68 strikes another arm 63 of the clincher lever 62 and thus positively swings the active part 65 down again to its initial position (see Fig. 19).

Thus, it will be seen, the device 16 co-operates with the operating lever member 3 to shift the locking member 73 and lock it in carriage-locking position, and co-operates with the lock 73 to cause the lever 3 to shift the carriage 2. The parts 15 and 30, moreover, afford a lost motion operating connection between the lever 3 and the device 16.

Referring now once more to Figs. 7 to 10, 13 and 14, it will be seen that a flat vertical actuator-plate 18 of quite irregular outlines extends lengthwise of the carriage 2 at its center, being straddled by the members of the lever 3. At its rear end, the plate 18 has a slot 20 through which extends a transverse pivot or fulcrum-rod 19 whose ends are secured in the sides of the carriage 2. At its forward end, the plate 18 extends through central slots in the upper ends of the punch 26 and the eyelet setting members 25 and 27, and has a slot 22 of varying width, through which extend transverse pins 24 and 23 in the ends of the members 26 and 25. The slots 20 and 22 allow the actuator plate 18 to shift back and forth a short distance with reference to the carriage (see Figs. 10, 13 and 14); moreover, the slot 22 and the pins 24 and 23 form an operating connection between the actuator and the members 26 and 25 which, as regards the punch 25 is to some extent a lost motion connection. An upstanding springy yoke 91 secured to the frame 41 at 56 co-operates with oppositely inclined faces on a portion 93 of the actuator 18 to prevent said actuator from moving with the carriage until positively constrained to do so, whereupon said part 93 snaps past the yoke.

Referring now especially to Fig. 10, it will be seen that when the lever 3 is fully raised, the actuator plate 18 is held in its rearward position by engagement of a roller 17 pivotally mounted at the rear upper corner of the part 8 with a portion 95 of an edge-cam in the inner outline of the plate, and is pressed downward by the same roller as far as permitted by engagement of the bar 13 on the part 8 in a notch 21 in the plate.

Under these conditions, all the members 26, 25, 27 occupy the positions shown. When the lever 3 is swung forward and downward, the bar 13 moves down and carries down the corresponding end of the actuator 18, thus depressing the members 26 and 25 and thereby making a hole in the material K and forming the prongs on a disc, as already described. With slight further movement of the lever 3, however, the push of the roller 17 on the cam protuberance 86 shifts the actuator 18 forward, thereby dissolving the connection between the lever 3 and the actuator hitherto established by engagement of the bar 13 in the notch 21; and thereupon the roller 17 acts on the cam-protuberance 86 to raise the forward end of the actuator and the punch 26 very quickly indeed, without, however, raising the member 25, owing to the lost motion permitted by its wide end of the slot 22. The roller 17 then trips past the cam-protuberance 86, Fig. 13, and is thus rendered ineffective on the actuator 18 during the further downward movement of the lever 3.

The continuing downward movement of the lever 3 beyond the position shown in Fig. 13 brings the front corners 29 of the part 8 to bear on the upper end of the member 27; and by this means the lever 3 depresses said member, independently of the actuator 18 and of the punch 26, with the effects on the eyelet already described. Downward movement of the member 27 and of the parts will finally be arrested by engagement of a flange 87 on said member 27 with the upper surface of the carriage-frame part 60. A little before this arrest, however, the pawls 12 will have struck the part 60 at their front corners and been unlatched from the lugs 13, thus allowing the lever 3 to swing downward on the pivot 9 (after the arrest of the part 8) as far as permitted by the slot 14, and to press the flattening or clinching part 65 home against the eyelet for the final squeeze thereof as already described.

When the lever 3 first swings upward (which it starts to do on the pivot 9 as a fulcrum), the pawl 12 is left free to relatch on the lugs 13; and the subsequent engagement of the lower corner 30 of the part 8 and of the lower ends of the pawls 12 with the bridge piece 16 positively ensures such relatching. Thereafter, the lever 3 swings on the pivot 7 as before. Referring to Fig. 13, on the return stroke of the lever 3, also, the bar 13 contacts with the under side of the lug 85, thus raising the lever 18 and attached members 25 and 26 and the sleeve 27 high enough to allow the part 32 of the shear 31 to rise to its normal position clear of the guide 51 before the carriage starts to move backward, and the rotation of the lever 18 also causes the finger 93 integral with the lever 18 to rise into the path of the upper part 94 of the part 91. As the carriage 2 reaches its rearmost position with the upward swing of the arm 3, the roller 17 on the part 8 strikes the cam surface 95 and restores the actuator 18 to its rearmost position shown in Fig. 10, thus re-establishing the connection of the actuator to the lever 3 by re-engagement of the bar 13 in the notch 21.

What I claim is:

1. The combination with a base, of a carriage mounted thereon and movable relative thereto, means on said carriage to receive a strip of material from which eyelets may be formed, means for punching a hole in material to be eyeleted and for centrally perforating said strip of eyelet material to form an eyelet provided with a number of downwardly disposed tangs, and means for severing said formed eyelet from said strip, inserting it in said hole, and clinching it in the material to be eyeleted while the carriage is in another position.

2. The combination with a movable member, of means carried thereby for piercing a hole in paper or the like when the said member is in a certain position, means on the said member for receiving a strip of material from which eyelets may be formed, means for shaping portions of said material to form eyelets, and means on said member for severing one of said eyelets, inserting it in the hole made by the piercing means, and clinching it in the paper while the member is in another position.

3. The combination with a base, of a member movable relative thereto, piercing means carried by said member for making a hole in paper or the like when said member is in one position, means on said base for supporting a strip of material from which eyelets may be formed, means on said movable member for engaging said strip and for forming eyelets thereon provided with projections, and means for inserting the projections on said eyelets through holes in the paper formed by the piercing means and clinching them to the paper when said movable member is in another position.

4. A machine comprising a feedway for a strip of material from which eyelets may be formed, a carriage shiftable to and fro in the direction of said feedway, means for punching a hole in material to be eyeleted when the carriage is at the rear of its movement and for drawing said strip forward with the advance of the carriage to bring a portion of the strip into correspondence with said hole, means for forming an eyelet on the end of said strip, and means for severing said eyelet from the rest of the strip and for eyeleting said hole therewith.

5. A machine comprising a carriage shiftable to and fro, means on said carriage for punching a hole in material to be eyeleted, means on the carriage for engaging the end portion of a strip of material from which eyelets may be formed when the carriage is in one position and during the forward advancing movement of the carriage, means for forming an eyelet on the end of the strip, means for severing said eyelet from the rest of said strip, and means for eyeleting said hole with said eyelet when the carriage is in another position.

6. A machine comprising a carriage shiftable to and fro, means on said carriage for punching a hole in material to be eyeleted and for forming an eyelet in a strip of material from which eyelets may be formed when the carriage is in one position, and means for inserting and clinching said eyelet in said hole when the carriage is in another position.

7. A machine comprising a carriage shiftable to and fro, means for punching a hole in material to be eyeleted, means on said carriage for receiving a strip of material from which eyelets may be formed, means on the carriage for forming an eyelet from the end of said strip when the carriage is in one position, and means for eyeleting said hole with said eyelet when the carriage is in another position.

8. A machine comprising a feedway for a strip of eylet material, a carriage shiftable to and fro in the direction of said feedway, means on said carriage for forming an eyelet in said strip when the carriage is at the rear of its movement and drawing the strip forward by the eyelet with the advance of the carriage, and means for severing the eyelet from the rest of the strip and setting it in the material to be eyeleted.

9. A machine comprising a feedway for a strip of eyelet material; a carriage shiftable to and fro in the direction of said feedway, means on said carriage for drawing the strip of eyelet material forward to a material to be eyeleted with the advance of the carriage, means for forming an eyelet at the forward portion of said strip, and means for inserting and clinching said eyelet in the material to be eyeleted when said carriage is in its forward position.

10. A machine comprising a feedway for a strip of material from which eyelets may be formed, a carriage shiftable to and fro in the direction of said feedway, means for drawing the strip forward with the advance of the carriage, means for forming an eyelet in the end portion of the strip, and means on said carriage for severing said eyelet from the strip when the carriage is in its forward position.

11. A machine comprising a carriage shiftable to and fro, means for forming an eyelet in a strip of eyelet material composed of a series of connected discs when the carriage is in one position, means on said carriage for carrying the formed eyelet therewith, and means for severing and clinching said eyelet when the carriage is in another position.

12. A machine comprising a carriage shiftable to and fro, means on said carriage for forming an eyelet in a strip of eyelet material when the carriage is in one position, means engaging said eyelet during the shifting movement of the carriage, and means for severing said eyelet from said strip when the carriage is in another position.

13. A machine comprising a carriage shiftable to and fro, means for forming an eyelet in a strip of material from which eyelets may be formed composed of a series of connected discs when the carriage is in one position, and means for severing said eyelet and setting the same when the carriage is in another position.

14. A machine comprising a feedway for strip of eyelet material, a carriage shiftable to and fro in the direction of said feedway, means for forming an eyelet in said strip when the carriage is in its rear position and for drawing the strip forward with the advance of the carriage, and means on said carriage for severing the eyelet from the rest of the strip and applying it to an article to be eyeleted when the carriage is in its forward position.

15. A machine comprising a feedway for a strip of eyelet material, a carriage shiftable to and fro in the direction of said feedway, an operating member on said carriage movable with reference thereto, means actuated by said member for shifting the carriage and for locking and unlocking it at the extremes of its range of movement, and means also actuated by said operating member for punching a hole in material to be eyeleted and forming an eyelet in the strip when the carriage is in its rear position, for drawing the strip forward with the advance of the carriage, for severing the eyelet from the rest of said strip, and for eyeleting the aforesaid hole therewith when the carriage is in its forward position.

16. A machine comprising a feedway for a strip of eyelet material, a carriage shiftable to and fro in the direction of said feedway, an operating member on said carriage movable with reference thereto, means actuated by said member for shifting the carriage, means for drawing the strip forward with the advance of the carriage, and means also actuated by said operating member for forming an eyelet in the forward end of the strip and for setting the same into a piece of material to be eyeleted.

17. A machine comprising a carriage shiftable to and fro, an operating member on said carriage movable with reference thereto, means actuated by said member for shifting the carriage, and means also actuated by said member for forming in a strip of eyelet material an eyelet when the carriage is in one position and for setting said eyelet in a piece of material to be eyeleted when the carriage is in another position.

18. A machine comprising a carriage shiftable to and fro, means on said carriage for engaging a strip from which eyelets may be formed when the carriage is in its rear position and adapted to move said strip forward when the carriage is advanced, an operating member on said carriage movable with reference thereto, means actuated by said member for shifting the carriage, means also actuated by said member for forming an eyelet from said strip and means for applying the eyelet to material to be eyeleted when the carriage is in its forward position.

19. A machine comprising a carriage shiftable to and fro, an operating member on said carriage movable with reference thereto, means actuated by said member for shifting the carriage, and means on said carriage also actuated by said member for severing an eyelet from a piece of eyelet-forming material when the carriage is in one position and for forming an eyelet from the said piece when the carriage is in another position.

20. A machine comprising a feedway for a strip of eyelet-forming material, a carriage shiftable to and fro in the direction of said feedway, means for drawing the strip forward with the advance of said carriage, an operating member on said carriage movable with reference thereto, means actuated by said member for shifting the carriage, and means on said carriage also actuated by said member for severing an eyelet from said strip when the carriage is in its forward position.

21. An eyeleting machine provided with a movable carriage, means on the carriage for effecting feeding movement of a strip of partially formed eyelets, and means operable when the carriage is in one position to complete the formation of an eyelet and, when in another position, to apply the said eyelet to an article to be eyeleted.

22. A machine comprising a carriage shiftable to and fro, an operating member on said carriage movable with reference thereto, means actuated by said member for shifting the carriage, and a plurality of means on said carriage also actuated by said member for feeding a strip of eyelet material, for punching a hole in material to be eyeleted when said carriage is in one position, and for eyeleting said hole with an eyelet when the carriage is in another position.

23. A machine comprising a carriage shiftable to and fro, an operating member on said carriage movable with reference thereto, means actuated by said member for shifting the carriage, a punch for the material to be eyeleted and a punch for forming an eyelet in a strip of material from which eyelets may be formed on said carriage, and means actuated by said member for operating both of said punches when said carriage is in one position and one only when it is in another position.

24. A machine comprising a carriage shiftable to and fro, an operating member on said carriage movable with reference thereto, means actuated by said member for shifting the carriage, a punch for the material to be eyeleted, a punch for forming an eyelet in a strip of material from which eyelets may be formed, a common actuator for said punches on said carriage, and means associated with said member for operating said common actuator in one position of said carriage, for subsequently rendering said last mentioned means ineffective, and for afterward operating one of said punches independently after shifting said carriage.

25. A machine comprising a carriage shiftable to and fro, an operating member on said carriage movable with reference thereto, means actuated by said member for shifting the carriage, a punch for forming an eyelet in a strip of eyelet material on said carriage, and means actuated by said member for operating said punch when said carriage is at one extreme of its movement.

26. A machine comprising a carriage shiftable to and fro, an operating member on said carriage movable with reference thereto, means actuated by said member for shifting the carriage, eyeleting means on said carriage comprising eyelet-forming and eyelet-clinching members, means actuated by said member for operating one of the members of said eyeleting means when the carriage is at either extreme of its movement, means for supporting a piece of eyelet material against the action of said eyelet forming member, and separate means for supporting the formed eyelet against the action of said clinching member.

27. A mechanism comprising a carriage shiftable to and fro, eyeleting mechanism and an actuator therefor on said carriage, an operating member on said carriage movable with reference thereto, means associated with said member for establishing and dissolving a connection between said member and the aforesaid actuator, and means operated by said member after dissolution of the aforesaid connection for actuating the eyeleting mechanism.

28. A machine comprising a carriage shiftable to and fro, eyeleting mechanism on said carriage an operating member on said carriage movable with reference thereto, means controlled by said member for operating said eyeleting mechanism, and means for locking and unlocking and shifting the carriage having a lost motion operating connection with said member.

29. A mechanism comprising a carriage shiftable to and fro, a movable locking member for locking said carriage in fixed position, an operating member on said carriage movable with reference thereto, and a device co-operating with said operating member to shift said locking member and to lock it in carriage-locking position, and with said locking member to cause said operating member to shift the carriage.

30. A mechanism comprising a carriage shiftable to and fro, a lock for locking said carriage in fixed position, an operating member on said carriage movable with reference thereto, and a device co-operating with said member to operate the lock and with the lock to cause said member to shift the carriage.

31. A machine comprising a movable carriage, a punch carried thereby, eyeleting mechanism carried thereby at a point removed from the punch, an oscillatory operating member, and means operated by the operating member, for punching a hole in material to be eyeleted, for shifting the eyeleting mechanism to a point opposite the perforation, and for inserting and clinching an eyelet in the said opening, all at one stroke of the said operating member.

32. A machine comprising a movable carriage, a punch carried thereby, eyeleting mechanism carried thereby at a point removed from the punch, an operating member, and means operated by the operating member, for punching a hole in material to be eyeleted, for shifting the eyeleting mechanism to a point opposite the perforation, for inserting and clinching an eyelet in the said opening, and for returning the movable parts of the machine to retracted position, all at one stroke of the said operating member.

33. A mechanism comprising a conical anvil, an eyelet setting device with inner and outer members movable toward and away from said anvil, means for supporting a strip of eyelet blanks for the opening of an eyelet therein by the said inner member which is movable out of the way to permit the said outer member to force the opened eyelet against the anvil and expand it, means movable in opposition to the outer member to flatten the expanded eyelet, and means actuated by one of the aforementioned movable parts for severing the said eyelet from said strip.

34. A mechanism comprising a conical anvil, an eyelet setting device with inner and outer members movable toward and away from said anvil, means for supporting an eyelet blank for the opening of an eyelet therein by the said inner member which is movable out of the way to permit said outer member to force the opened eyelet against the anvil and expand it, and means movable in opposition to the outer member to flatten the expanded eyelet.

35. A mechanism comprising an anvil, an eyelet setting device with inner and outer members movable toward and away from said anvil, and means for supporting an eyelet blank for the opening of an eyelet therein by the said inner member which is movable out of the way to permit said outer member to force the opened eyelet against the anvil.

36. A mechanism comprising an anvil, an eyelet setting device with inner and outer members movable toward and away from said anvil, means for supporting an eyelet blank for the opening of an eyelet therein by the said inner member which is movable out of the way to permit said outer member to force the opened eyelet against the anvil, and relatively movable knife members for severing the eyelet piece, one of said members having an actuating portion in the path of the said outer member.

37. The combination of a knife member with a cutting edge at one end, a knife yoke mounted on the other end of said member and flexible back and forth across its cutting edge, and an eyelet-clinching part on the movable end of said yoke for operating on an eyelet severed from a strip of eyelet material by said knife and yoke.

38. In combination, a base, a carriage capable of limited movement on said base, mechanism for feeding a strip of eyelet material consisting of a series of pronged discs connected together with the prongs lying flat, a punch of a diameter which makes a hole large enough in material being eyeleted to allow the free passage of said prongs, a second punch of smaller diameter for opening out the prongs of one of the discs at a time to form eyelets, means for spreading the prongs of said eyelet after it has been passed through the hole in the material being eyeleted, means for cutting off said eyelet from the rest of the strip and means for clinching said eyelet so it will lie flat against the material being eyeleted.

39. In combination, means for punching a hole in material to be eyeleted, mechanism for feeding an eyelet furnished with prongs capable of passing freely through said hole, means for withdrawing said punching means from said hole and inserting said eyelet in said hole, means for clinching said eyelet to said material, and operating means for actuating all the above mentioned means to cause them to perform their various functions with one stroke of said operating means.

40. In combination, mechanism for feeding a strip of flat eyelet blanks, each having a plurality of prongs, a guide for said strip mounted in a carriage which is in turn mounted on a base, means for opening out the prongs of one eyelet blank at a time, means for supporting said blank while its prongs are being opened out to form an eyelet, means for punching a hole in material to be eyeleted of a diameter large enough to permit the free passage of the prongs of said eyelet after they are opened out, means for removing said supporting means from under said eyelet to allow inserting means to insert said prongs through the hole made by said punching means, and means for clinching said eyelet in said material.

41. In combination, mechanism for feeding a strip of flat eyelet blanks having a plurality of prongs which normally lie flat, a guide for said strip mounted in a carriage which is in turn mounted on a base, means for bending down the prongs of one of said eyelet blanks at a time, means for supporting said blank while its prongs are being bent down to form an eyelet, means for punching a hole in material to be eyeleted of a diameter large enough to permit the free passage of said prongs after they are bent down, means for removing said supporting means from under the eyelet to allow inserting means to insert said prongs through the said hole in said material, means for cutting off this eyelet from the rest of the strip, means for bending outward and clinching said prongs to said material, and an operating means for actuating all the above mentioned means so they will perform their various functions all with one stroke of said operating means.

42. In combination, mechanism for feeding a strip of eyelet material consisting of a series of pronged eyelet blanks connected together by a narrow neck, with the prongs lying flat, a base, a carriage mounted on said base, means contained in said carriage for carrying said strip, and an operating member for actuating the mechanism carried by said base and carriage and consisting of a punch of a diameter which makes a hole in material to be eyeleted large enough to allow the free passage of said prongs, a second punch of smaller diameter for opening out the prongs of one eyelet blank at a time to form an eyelet, means for supporting said eyelet blank while it is being opened out by said second punch, means for cutting off said eyelet from the rest of the strip, means for further bending out the prongs of said eyelet, and means for clinching said eyelet so it will lie flat against the material being eyeleted.

43. A machine comprising a carriage shiftable to and fro, means on said carriage for receiving a strip of material from which eyelets may be formed, means on said carriage for punching when the carriage is in one position in a material to be eyeleted a hole larger than the part of the eyelet which passes through said hole and for forming an eyelet in said strip of eyelet material, means on said carriage for eyeleting said hole when the carriage is in another position and for setting said eyelet, and an operating member operable during its movement in one direction to effect the actuation of said means.

In testimony whereof I have hereunto affixed my signature this 13th day of April, 1921.

ANDRÉ KORONSKI.